(No Model.) 2 Sheets—Sheet 1.
W. J. GURD.
DIAPHRAGM METER.
No. 445,552. Patented Feb. 3, 1891.
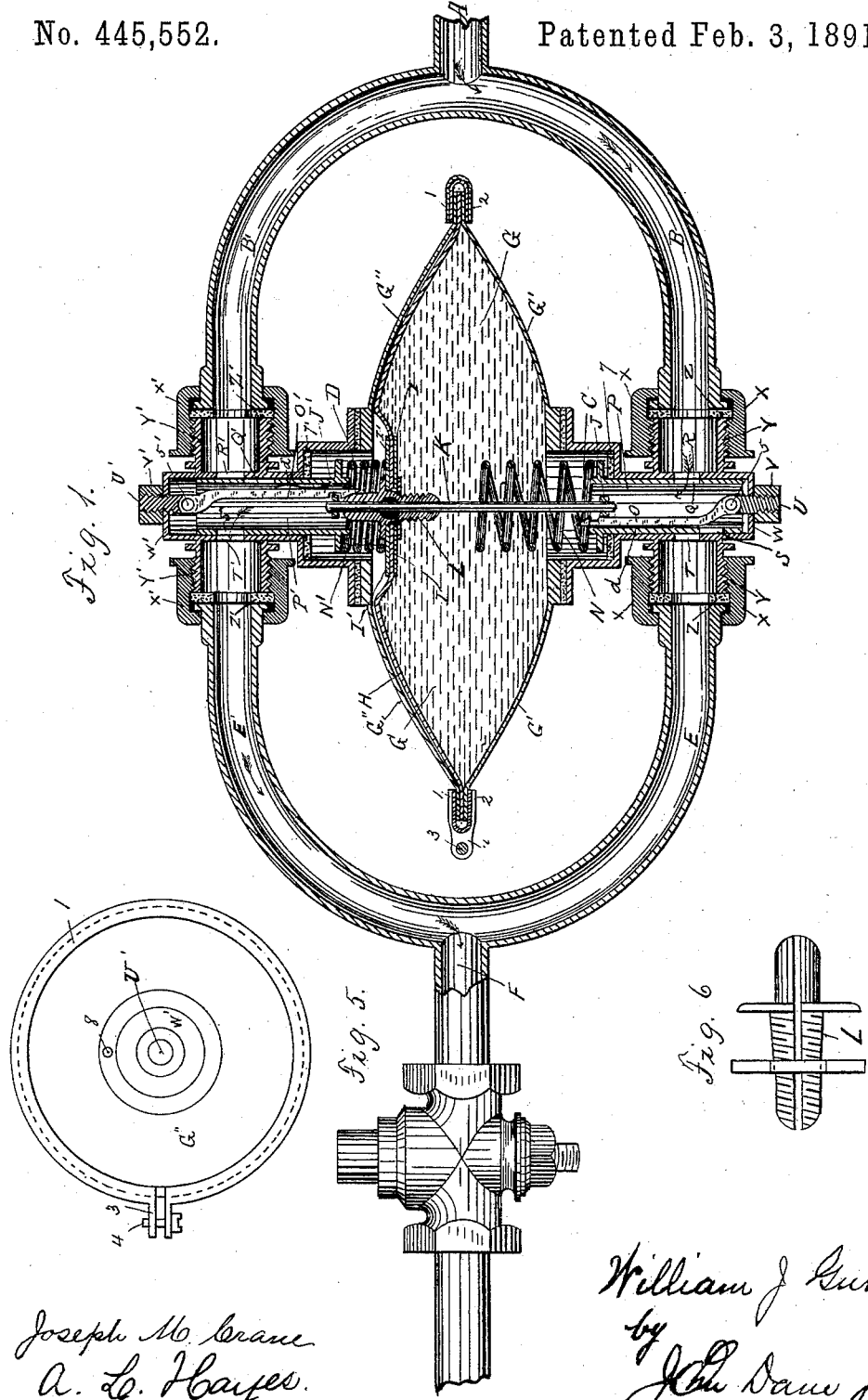
Witnesses:
Joseph M. Crane
A. L. Hayes.
Inventor:
William J. Gurd
by John Dane Jr
his Atty (No Model.) 2 Sheets—Sheet 2.
W. J. GURD.
DIAPHRAGM METER.
No. 445,552. Patented Feb. 3, 1891.
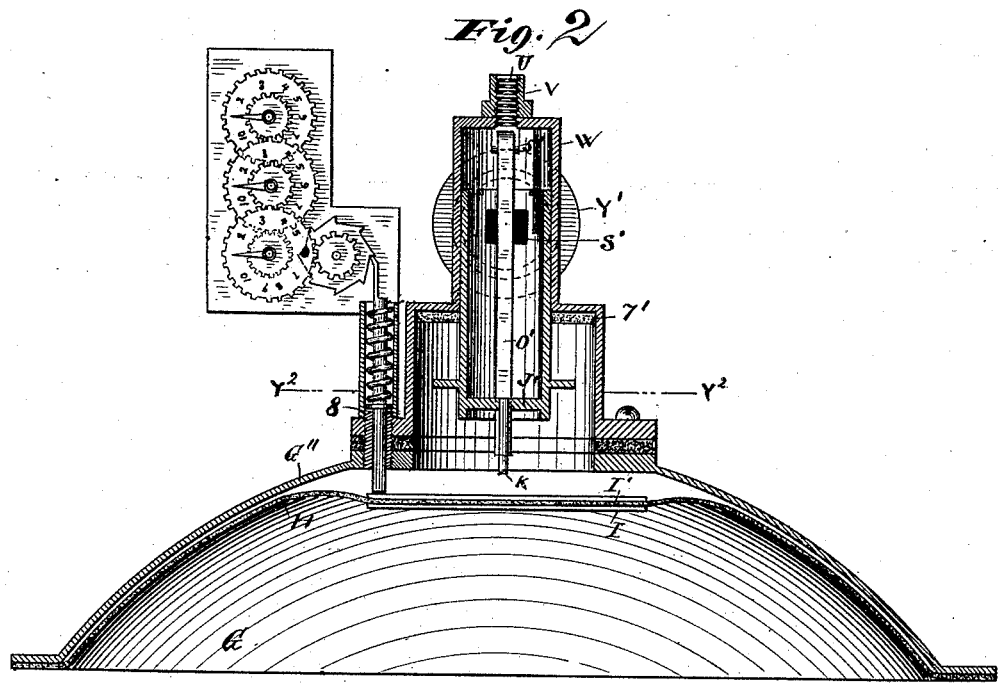
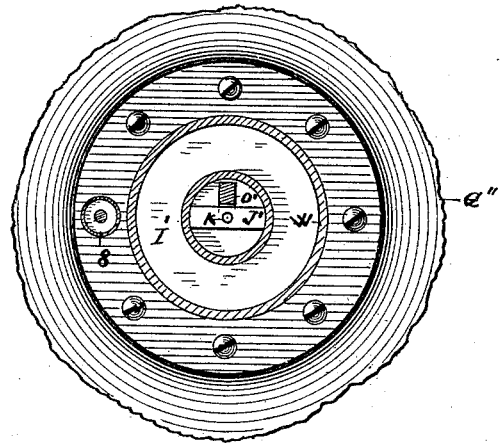
WITNESSES:
INVENTOR

UNITED STATES PATENT OFFICE.

WILLIAM J. GURD, OF SARNIA, CANADA.

DIAPHRAGM METER.

SPECIFICATION forming part of Letters Patent No. 445,552, dated February 3, 1891.

Application filed February 23, 1886. Serial No. 192,822. (No model.)

*To all whom it may concern:*

Be it known that I, WILLIAM J. GURD, a citizen of the Dominion of Canada, and a resident of the town of Sarnia, in the county of Lambton and Province of Ontario, Canada, have invented certain new and useful Improvements in Meters for Measuring and Registering Fluids, Gases, &c., of which the following is a specification.

My invention relates to meters of a character adapted to correctly measure and register the quantity of such elements as may be desirable to pass through an apparatus for measurement and registration, such as fluids, gases, steam, &c.; and it consists of a hollow chamber with a centrally-arranged diaphragm within, with centrally-located orifices at or near the center of the periphery of the said chamber, through which the elements are to pass in practice, with valve connections at opposite points at the outsides of the chamber, adapted for automatic operation while in practical use.

It consists also of certain other details, in combination with the above, by which the valves and the registering apparatus are operated, all of which will be explained more minutely in the following specification, and pointed out in the claims thereof.

The object of my invention is to produce a measuring and registering meter for various purposes that shall be simple, cheap, effective, reliable, not easily impaired by use, and correct in its results, thereby obviating many of the objectionable features heretofore existing in devices for a like or similar purpose.

Referring to the drawings, Figure 1 represents a sectional view of a meter embodying my invention at a line through the center thereof, exposing the channel-ways, hollow chamber, diaphragm, and other details. Fig. 2 represents a detail portion of my meter, showing the registering apparatus, with the means for operating the same, attached to a sectional part of the shell which forms a part of the chamber. Fig. 3 represents different views of my improved device, and Fig. 4 represents an enlarged view of the actuating end of the latch-levers O and O'. Fig. 5 represents a top view of the disks G G, showing the strap connection. Fig. 6 represents a detached view of the sleeve L.

Referring to the drawings, A represents the inlet-orifice for the admission of fluids or other matter into the passage-ways, through which it is guided into the chamber (represented at G) through the valve-ports R Q and R' and Q' and center passages, represented at C and D.

B and B' are passage or channel ways (in the particular instance are formed of piping) for directing the elements to the central opening C D, located at the center of the chamber.

E and E' are passages through which the elements pass from the meter.

F is the discharge orifice or outlet, into which delivery is made from the passages E and E'.

G' G'' are circular concave parts or disks, which together form a shell, and thereby a space between, forming a chamber, and H represents a flexible diaphragm, of suitable material, secured at suitable points within, and in the particular instance held by and between the edges or outer periphery of the disks or concave parts G' G'', as shown in Fig. 1 of the drawings, and I represents a plate or plates of a more rigid substance, in this instance shown as embracing the central part of the flexible diaphragm. These plates serve to present a suitable surface to operate against, and push a piston, which in turn operates the registering apparatus and springs. (Shown in Figs. 2 and 3.)

J and J' are parts forming bars or head-pieces secured to the ends of the cylindrical valves, and by which they are connected by a rod K, which is supported in position by a sleeve forming a stuffing-box supported by diaphragm-clamps I and I', which sleeve is shown at L, and is in the present instance formed in two parts, or slitted to be readily compressed, being provided with a threaded exterior engaged by threaded counterparts cut or formed in the clamping-disk, serving as nuts, which when connected serve a triple purpose—to wit, a bearing-surface for the rod K to reciprocate in, a stuffing or packing box to prevent leakage around the rod, and means for clamping and holding the diaphragm and disk-plates together; and N N' are coiled springs by which valves P and P' are operated in one direction, and O and O' are pawls or latch-levers hinged to lugs or points within the valves, as shown in the drawings, Fig. 1, near the extremities of the two sides, which latches serve to check and assist the tubular valves P and P' to operate, as will be hereinafter more fully set forth, and Q R and Q' R' are inlet-ports for the admission and passage of steam, fluid, or other matter into the chamber, and S T and S' T' are outlet-ports from the chamber, and through which the contents of said chamber are discharged.

U and U' are lugs or devices located within, although at or near the extreme outer sides of the meter within the valve-frame, as means to which the latch-levers O O' are hinged, and in the particular instance are threaded at one end and provided with a nut (shown at V and V') for adjustment of the parts when desirable, although a suitable form is represented in Fig. 1 of the drawings. It will be readily understood that various other methods of applying or attaching the latches may be adopted—as, for instance, the lugs may be cast or otherwise formed or secured in the proper position for attaching the latch-lever; or even a recess might be formed for the admission of the end of the latch-levers, and such means I should consider equivalent without departing from the spirit of my invention.

W W' are parts of what might be properly termed a "cock" or "valve" frame, provided with chambers, within which the cylindrical or tubular valves are reciprocated.

X X X' X' and Y Y Y' Y' are union-couplings, with threads for connecting the pipes to the cock or valve frame, which method is well understood by all mechanics.

Z Z Z' Z' represent packing, of suitable material, interposed at the points or point of union of pipe and cock or valve frame to maintain a tight joint to prevent leakage. The concave disks, which together form the chamber, are in the particular instance united and held together by a strap provided with a groove or furrow so formed that it will cover and inclose the outer edges or periphery of the two disks by straddling, as shown in Fig. 1 of the drawings at 1 and 2, the construction and width of the groove being such as to close over and impinge the edges of the two disks G' and G'' together more tightly, as the strap is drawn by means of an adjusting screw or screws with which the strap is provided. In this case the strap is shown as consisting of a single piece, although it may be composed of more than one and united in any suitable manner, the method described making a simple, cheap, and effective means for firmly and closely uniting the edges, and as an additional security against leakage at the union so made. The cylindrical valves P and P' are each provided with two openings upon opposite sides thereof, although not opposite each other, as will appear upon an inspection of the drawings. (See S Q S' and Q'.) These openings form the ports through which the supply is passed in practice when in proper position, and in unison with the openings with which the valve-frames are provided these cylindrical valves are also provided with a flange against which the coiled springs operate to move them, and which springs also serve to give an accelerated movement to the valves at the proper time. The valves are closely fitted into their places and are reciprocated longitudinally, as will be hereinafter more fully explained. The latch-levers O and O' are of a length sufficient to extend to a point to rest and slide upon the bar or piece formed across the ends of the cylindrical valves. When the latter are withdrawn their fullest extent, the notch or shoulder with which they are provided falls and contacts with the bar-piece J' of the valve, caused by springs d and d', which are secured at one end on said latch-levers, and their opposite ends have a bearing against the said valves, in order to exert an inward pressure on said latch-levers to cause the notch located near the ends of the same to readily engage the said bar-pieces J and J', and remains until released by engagement with the stuffing-box, as will be hereinafter more fully explained.

The drawings disclose a suitable form of parts and structure representing the principles of my invention, which will admit of many modifications.

The operation of my meter is as follows: The water or other matter to be passed through the apparatus for measurement or registration, or both, is admitted at A and follows the channel or passage-way B in the direction of the arrows shown in the drawings through an open port at R, thence through a central opening in the shell, (forming the chamber,) pushing against the diaphragm H, which at the moment the fluid or other elements are admitted is resting against the side of the chamber in the same manner as, although opposite from, that represented in Fig. 1 of the drawings, the flow and pressure thereof pushing the said diaphragm over to and against the side where it now appears in Fig. 1. The movement of the diaphragm from its starting-point over toward the other or opposite side engages the coiled spring N' and pushes it along and moving with it the sliding tubular valve P' until it is checked by the latter lever engaging the bar across the end of the valve until the stuffing-box, with its rounded end, engages with the rounded or slanting end of the latch-lever O', which lifts the said latch until it is released from the bar J', with which the cylindrical valve is provided. The moment the latch-lever is lifted the coiled spring (which is now nearly set or compressed) "shoots" the valve (by the expansion of the spring) quickly into position, presenting its port Q' before the inlet-opening R', and closing the ports S' T', through which a measure of its contents has just been discharged and registered. The ports Q' R' being now open and the former discharge-orifice S' and T' closed, the flow of matter begins in a direction opposite the former, through the passage-way B' into the chamber, through the end or side of the meter opposite that already explained, and operating precisely the same as the former. Opposite sides of the meter, including passage-ways, are constructed and arranged to operate precisely alike, although the like parts operate alternately instead of in unison. Thus when the chamber G has been filled to its utmost capacity the latch-lever O or O' is lifted from contact with the bar or cross-piece J', with which the cylindrical valve is provided, and the valve is instantly forced or shot into position to open the port Q' R' for the admission of a new supply or flow, and, being connected by the rod K to the cylindrical valve P (at the opposite side of the meter,) this also is advanced into position, closing ports Q R and opening ports S T, and through the latter the contents of the chamber are discharged. Thus it will be understood that the moment the chamber is filled the supply-valve is operated and flow stopped, and the discharge-valve located at the opposite side is simultaneously opened and the contents passed out, and thus the two sides of the apparatus operate for the purpose of measuring and registration of the fluid or matter passed through it.

The registration of the quantity passed through the meter is as follows: For instance, the chamber should hold one quart of fluid, which amount has forced the diaphragm over against the one side of the chamber opposite the entering fluid. This act pushes the pin or piston (more clearly shown in Fig. 2) outwardly, and in turn engages a ratchet-wheel connecting with suitable gearing and dials, which indicate one for each actuation of the piston, which of course represents one quart discharged, as this quantity must pass out before another can come in. The register may be made to indicate "doubly" for the opposite side or the meter may be supplied with a piston and a register upon each side, although for most purposes a single register will suffice by causing it to register doubly, (one for each supply and discharge of the chamber,) or the single registration produced by the action of the diaphragm upon the single piston may be multiplied by two, as each impulse or complete movement of the diaphragm enables the chamber to receive and discharge one quart of fluid. Hence it will be readily understood, as I claim nothing new in the registering wheels and dials *per se*, a further description would seem needless at this time.

Having thus set forth my invention, what I claim as new, and desire to secure by Letters Patent of the United States of America, is—

1. The combination, in a registering-meter for fluids, &c., consisting of a chamber composed of two disks, substantially as shown, with a flexible diaphragm secured in position between the united edges of said disks, two channel-ways connecting with and extending from a supply or inducting pipe adapted to convey the contents into the center of the chamber, and two channel-ways connecting at the same centers for the discharge of the same, substantially as and for the purpose set forth.

2. In a registering-meter for fluids, &c., the combination, with a chamber whose only openings are located at the center thereof and a centrally-arranged flexible diaphragm, of valves adapted to reciprocate horizontally by means of the said diaphragm, and by which the supply and discharge of the meter are regulated, substantially as set forth.

3. In a registering-meter for fluids, &c., the combination, with a chamber provided with a centrally-located flexible diaphragm, of sliding tubular valves adapted to operate in conjunction with said diaphragm, substantially as and for the purpose set forth.

4. In a registering-meter for fluids and other matter, the combination, with a receiving and discharging chamber, operating flexible diaphragm, and inducting and discharge channels, of tubular sliding valves located at each side of said diaphragm, substantially as described, whereby the said matter to be measured is received, directed, and discharged in measured quantities, substantially as set forth.

5. The combination, in a registering-meter consisting of a chamber formed of two concave disks provided with central openings and a flexible diaphragm interposed between, substantially as set forth, and two tubular valves provided with receiving and discharge ports, of one or more coiled springs serving to impart an accelerated movement to the valves, substantially as and for the purpose set forth.

6. In a registering-meter, the combination, with a chamber and flexible diaphragm such as described, inducting and discharge channel-ways, valves, and springs, of latch-levers for holding in check the said valves, substantially as and for the purpose set forth.

7. In a registering-meter, the combination, with a chamber, interposed flexible diaphragm, inducting and discharge valves, springs, and latch-levers, of a rod connecting said valves, whereby they are moved in unison, substantially as and for the purpose set forth.

8. In a registering-meter, the combination, with a receiving-chamber, flexible diaphragm, inducting and discharge valves, springs, latch-levers, and rod uniting said valves, of a device operated by said diaphragm and adapted to lift said latch-levers, substantially as and for the purpose set forth.

9. In a registering-meter substantially such as described, the combination, with a flexible diaphragm, of a device serving as a sleeve, stuffing-box, and trip for operating the latch-levers, substantially as and for the purpose set forth.

10. The combination, in a registering apparatus consisting of two concave disks, a centrally-located flexible diaphragm supporting a piston adapted to vibrate through its center, sliding tubular supply and discharge valves located at opposite ends of said piston and adapted to be operated by the same, and a grooved strap for inclosing and uniting the outer periphery of said disks together, united and clamped substantially as shown and set forth.

11. In a registering-meter substantially such as described, the combination, with a flexible diaphragm and chamber, of a pin or piston adapted to be operated by the movement of said diaphragm, whereby a registering device is operated, substantially as set forth.

12. In a registering-meter substantially such as described, provided with a receiving-chamber, and a flexible diaphragm adapted to vibrate from side to side within said chamber, of a pin or piston adapted to reciprocate through the side thereof and operate a ratchet and dials for registering the quantity of matter passed through the meter, substantially as set forth.

13. In a meter for fluids, &c., the combination, with a receiving-chamber provided with a diaphragm adapted to vibrate from side to side and operate coiled springs, of tubular valves provided with exterior flanges against which said springs act, substantially as and for the purpose set forth.

WILLIAM J. GURD.

Witnesses:
JOHN DANE, Jr.,
JOSEPH M. CRANE.